United States Patent [19]
Strolle et al.

[11] Patent Number: 5,113,262
[45] Date of Patent: May 12, 1992

[54] VIDEO SIGNAL RECORDING SYSTEM ENABLING LIMITED BANDWIDTH RECORDING AND PLAYBACK

[75] Inventors: Christopher H. Strolle, Glenside, Pa.; Chandrakant B. Patel, Hopewell; Werner F. Wedam, Lawrenceville, both of N.J.; Jung W. Ko, Suwon, Rep. of Korea; Raymond Schnitzler, Piscataway, N.J.; Jong K. Yun, Kyunggi, Rep. of Korea

[73] Assignee: SamSung Electronics Co., Ltd., Kyung Ki, Rep. of Korea

[21] Appl. No.: 569,029

[22] Filed: Aug. 17, 1990
(Under 37 CFR 1.47)

[51] Int. Cl.$^5$ .............................................. H04N 9/79
[52] U.S. Cl. .................................... 358/310; 358/323
[58] Field of Search ................. 358/330, 334, 329, 31, 358/11, 21 R, 13, 133, 108, 105, 135; 360/8, 33.1

[56] References Cited

U.S. PATENT DOCUMENTS

| | | | |
|---|---|---|---|
| 4,698,672 | 10/1987 | Chen et al. | 358/136 |
| 4,855,815 | 8/1989 | Yasuki et al. | 358/31 |
| 4,868,650 | 9/1989 | Weckenbrock | 358/31 |
| 4,870,481 | 9/1989 | Kawamata | 358/31 |
| 4,922,331 | 5/1990 | Ezaki | 358/31 |
| 4,951,129 | 8/1990 | Lang | 358/31 |
| 4,961,108 | 10/1990 | Perlman | 358/31 |
| 4,972,259 | 11/1990 | Motoe et al. | 358/31 |
| 4,974,065 | 11/1990 | Murakami et al. | 358/31 |
| 4,984,068 | 1/1991 | Sugiyama et al. | 358/21 R |

*Primary Examiner*—Roy N. Envall, Jr.
*Assistant Examiner*—Thai Tran
*Attorney, Agent, or Firm*—Robert E. Bushnell

[57] ABSTRACT

An improved video signal recording system for recording a full bandwidth video signal on a limited bandwidth medium is disclosed. The recording system includes an encoder, coupled to an input terminal, for adaptively processing a composite video signal in response to a motion representative signal, and producing two signals; a luminance signal, having attenuated high frequencies subsampled so as to be folded into a spectral hole in the low frequencies, and being bandwidth limited to the limited bandwidth of the recording medium; and a combined signal including a chrominance and a motion component. Luminance signal recording circuitry records the folded luminance signal on the medium and chrominance signal recording circuitry records the combined chrominance and motion signal on the medium. An improved video signal playback system for reproducing such a prerecorded video signal is also disclosed. The playback system consists of a luminance signal playback circuit for retrieving the prerecorded luminance signal from the medium, and chrominance signal playback circuit for retrieving the prerecorded combined chrominance and motion signals from the medium. A decoder extracts the motion signal and the chrominance signal from the combined chrominance and motion signal and an unfolding circuit extracts the luminance high frequencies from the prerecorded folded luminance signal and adaptively regenerates the full bandwidth luminance signal in response to the motion signal. This regenerated full bandwidth luminance signal is combined with the chrominance signal to reproduce the originally recorded composite video signal. A recording medium previously recorded by such a recording system is capable of being played back on a standard playback system without objectionably artifacts in the reproduced image.

27 Claims, 6 Drawing Sheets

VIDEO SIGNAL RECORDING SYSTEM ENABLING LIMITED BANDWIDTH RECORDING AND PLAYBACK

This application is related to the following applications, the claimed inventions of which were commonly owned or subject to an obligation of assignment to Samsung Electronics Co., Ltd. at the time the inventions were made:

IMPROVING THE REMOVAL OF THE FOLDING CARRIER AND SIDEBANDS FROM AN UNFOLDED VIDEO SIGNAL, filed Aug. 6, 1990 by Strolle et al., Ser. No. 07/562,907.

CONTROL SIGNAL SPREADER, filed May 31, 1990 by Ko et al., U.S. Pat. No. 5,083,203.

APPARATUS FOR RESTORING THE CORRECT PHASE RELATION OF THE CHROMA AND LUMINANCE SIGNALS PASSED THROUGH SEPARATE PATHS, filed May 31, 1990 by Ko et al., U.S. Pat. No. 5,083,197.

COLOR-UNDER CHROMA CHANNEL ENCODED WITH AUXILIARY SIGNALS, filed May 31, 1990 by Strolle et al., Ser. No. 07/531,070.

The present invention relates to a signal processing system for a video cassette recorder (VCR) yielding improved video quality while maintaining backward compatibility for playing back video cassettes recorded by this improved system on current VCRs.

Current home VCRs record video information onto video tape cassettes in one of several formats. The well-known VHS system produces degraded picture quality chiefly because there is insufficient horizontal resolution. An enhanced VHS system, popularly called Super VHS (S-VHS), produces enhanced picture quality by recording a full bandwidth video signal on the video tape cassette, thus yielding improved picture quality. Such a system requires higher quality tape in the cassette and higher quality recording and playback mechanisms and circuitry. However, the S-VHS system is not backward compatible with standard VHS VCRs. That is, although a S-VHS VCR can play back cassettes recorded on either S-VHS or standard VHS VCRs, a standard VHS VCR cannot play back cassettes recorded on S-VHS VCRs.

It has long been a goal of video engineers to increase the amount of information transmitted through a given narrowband channel, such as NTSC, which is limited to 4.2 MHz of bandwidth. Because the frame and line rates are usually fixed, restricting the bandwidth translates into restricting the horizontal resolution. In some cases, the bandwidth of the channel is limited to 3 MHz or even 2.5 MHz resulting in an image with insufficient horizontal resolution.

It has been long recognized that the video spectrum has holes in which the signal energy is very small. The NTSC color system represents a system which uses one of these holes to carry the color information. In the NTSC system, the color information is recorded on a color subcarrier whose frequency is very carefully selected so that a minimum disturbance occurs when a color signal is displayed on a black and white receiver. Specifically, the frequency of the color subcarrier is interleaved horizontally, vertically, and temporally to minimize the crosstalk between the luminance and chrominance components of the composite video signal.

It was recognized at around the time of the adoption of the NTSC system that such frequency holes could also be used to transmit additional horizontal information to increase the horizontal resolution of the reproduced image. In these systems, the high frequency horizontal information was interleaved with the low frequency horizontal information in a similar manner as the chrominance information is in the NTSC color system. An article titled "REDUCTION OF TELEVISION BANDWIDTH BY FREQUENCY INTERLACE" by Howson contains a description of such a system which operated in the analog domain. This system, however, could not accurately reproduce the full bandwidth image in its original form because it was unable to completely remove the artifacts resulting from the frequency interleaving, which manifested themselves as annoying dot crawl patterns.

Sampled data digital video signal processing techniques were later developed using subNyquist sampling (sometimes termed subsampling) to address the problem. These techniques involved replacing every odd sample in a first video line with a zero valued sample, and then on the next line, replacing every even sample with a zero valued sample. On alternate frames, the patterns are reversed.

German Patent Application 82100286.2 entitled "Verfahren zum Übertagen von Fernsehsignalen über einen genormten bandbreitebegrenzten Übertragunskanal und Anordnung zum Durchführen des Verfahrens.", filed Jan. 1, 1982 by Professor Wendland et al, describes principles of offset subsampling and bandwidth compression as applied to advanced television systems. This patent also describes techniques for implementing television systems in accordance with the described principles.

Theoretically, the Howson frequency folding technique and the subNyquist sampling technique are equivalent. But, although theoretically equivalent, the later sampled data digital systems provided improved reconstruction of the received image because of the existence of line and frame combing techniques, which had not been developed at the time of the Howson system. The subNyquist sampling techniques, however, were developed for totally sampled data digital systems as data reduction techniques. Signals generated by these systems were not intended to be passed through a narrowband analog channel.

In an article "DEVELOPMENT OF HDTV RECEIVING EQUIPMENT BASED ON BAND COMPRESSION TECHNIQUE (MUSE)", by Kojima et al. in IEEE Transactions on Consumer Electronics, Vol. CE-32, No. 4, November 1986, pp. 759-768, another data compression scheme is described which achieves bandwidth compression by sampling each pixel once every other frame. This scheme works well for non-moving images. For moving images, a motion vector is developed, and the actual rate of sampling of each pixel is adaptively varied in response to the motion vector so that a sample of the pixel is transmitted every other frame on the average, but more often when that pixel is representing a moving image.

U.S. Pat. No. 4,831,463, issued May 16, 1989 to Faroudja, describes apparatus for processing a video signal having a predetermined bandwidth in order to pass the video information through a limited bandwidth channel, such as a magnetic tape. In the apparatus described in this patent, a video signal preprocessor includes a comb filter to produce a spectral hole, such as described above, between spectrally active areas in the video signal spectrum. A folding circuit folds the high frequency video components of the video signal about a predetermined folding frequency selected so that the folded high frequency component is placed in the spectral hole previously made in the video signal. A low pass filter then filters the resulting folded video signal so that its bandwidth is about ½ the bandwidth of the original video signal. The resulting signal may then be transmitted through the limited bandwidth channel.

This patent further described a post processor which receives a folded signal from the limited bandwidth channel. The post processor includes an unfolding circuit which unfolds the received signal about a predetermined unfolding frequency. A comb filter then processes the unfolded signal to remove the alias components resulting from the unfolding process. The signal produced by this comb filter closely approximates the original video signal in terms of the bandwidth and information content.

Both the Howson article and the Faroudja patent describe folding systems which, if incorporated into an improved VCR, would not produce cassettes which would be able to be played back on present VCRs without introducing unacceptable artifacts. This is primarily due to the magnitude of the folded high frequency component present within the low frequency component, on the previously recorded cassette. The magnitude of the folded high frequency component is sufficiently high as to introduce intolerable artifacts into an image produced from a video signal from which the folded high frequency component were not properly removed.

It is desirable that an improved video recording system be able to record wider bandwidth video signals on a standard quality cassette than those recorded by present VCRs, but maintain backward compatibility with present VCRs, and not require especially high quality magnetic tape or record and playback mechanisms. That is, it is desirable that standard quality cassettes which are recorded using the improved system be able to be played back, without noticeable visual artifacts, on present VCRs (even if the present VCR may not be able to reproduce the full bandwidth signal recorded on such a cassette.)

In accordance with principles of the present invention, a full-bandwidth video signal is passed through an encoder which generates a signal having a low frequency component with a reduced amplitude high frequency component folded into it. Signals produced by the output of the encoder are recorded on a video cassette.

When reproduced by a VCR according to principles of the present invention, the folded reduced amplitude high frequency component may be recovered and the full-bandwidth video signal be reproduced. When reproduced on a present VCR, the high frequency component is at a low enough level so that any interference is not objectionable.

Howson was not concerned with backward compatibility, and instead includes a pre-emphasis filter, which boosts the high frequency components of the luminance signal in order to minimize the effect of crosstalk from the low frequency luminance components during the transmission of the folded signal through the channel. If a video cassette recorded by a VHS VCR modified to include the system described by Howson were played back on a standard VHS VCR, the interference of the pre-emphasized high frequency components which would not be removed would produce an even more objectionable image than that produced by the Faroudja system.

The Faroudja patent does not include any discussion of compatibility with pre-existing record media and apparatus, other than a mention that it is one object of that invention. There is no teaching of any apparatus or process for achieving backward compatibility. As described above, a system according to the Faroudja patent is not backward compatible because of the high level of the folded luminance high frequencies in the luminance low frequencies.

In the Figures, equalizing delays have been omitted for the purposes of simplicity. One skilled in the art of video signal processor design will appreciate the need for such delays to properly time align pixels subject to different delays on different processing paths due to the differing processing performed in those paths. One skilled in the art would understand where such delays would be necessary and how long each of the delays would have to be, and such delays will not be discussed below.

In addition, in the Figures, various filters are used for filtering in the horizontal, vertical, and temporal directions, having both high pass and low pass response characteristics. One skilled in the art of video signal processor design will appreciate that such filters may be constructed as known comb filter designs, and would understand how to properly select the delay period of the delay lines, the number of taps and the weighting of the taps. Consequently, the detailed design of such comb filters will not be discussed below, unless such a design is important for other reasons.

Also, in the Figures, and the detailed description below, various embodiments constructed in accordance with principles of the present invention are directed to an NTSC video signal. One skilled in the art would understand to modify the embodiments in order to process a PAL video signal, a SECAM video signal or a video signal according to any other standard. Such embodiments could still be constructed in accordance with principles of the present invention.

Figure 1:
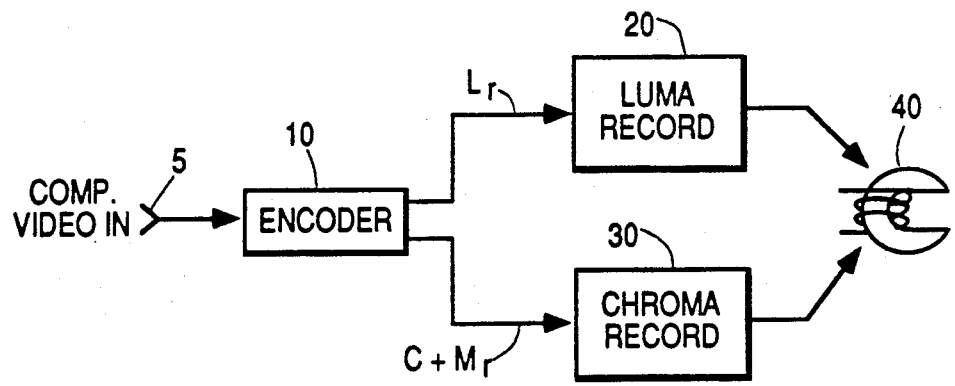
FIG. 1 is a block diagram of the record section of a video recorder according to principles of the present invention.

FIG. 1 is a block diagram of a portion of a record section of a video signal recorder according to principles of the present invention. In FIG. 1, an input terminal 5 is coupled to a source (not shown) of a video signal; for example, an NTSC composite video signal. Input terminal 5 is coupled to an input terminal of an encoder 10. A first output terminal of encoder 10 is coupled to an input terminal of a luminance record circuit 20, similar to those found in present VCRs. An output terminal of the luminance record circuit 20 is coupled to a record head 40 in a standard tape transport mechanism, similar to those found in present VCRs. A second output terminal of encoder 10 is coupled to an input terminal of a chrominance record circuit 30, similar to those found in present VCRs. An output terminal of the chrominance record circuit 30 is also coupled to the record head 40. The record head records the signal supplied to it on magnetic tape (not shown) in a standard video cassette.

In operation, the encoder 10 takes a standard full-bandwidth NTSC signal and generates a luminance signal Lr, which has the same reduced bandwidth as a standard luminance signal produced by a present VCR. But the luminance signal Lr is a composite signal including a low frequency component with a reduced amplitude high frequency component folded into it. The luminance signal Lr, thus, contains all the information from the full-bandwidth NTSC signal, within the reduced bandwidth which can be recorded on the cassette. This allows standard quality cassettes and record and playback mechanisms to be used. In addition, the reduced amplitude of the folded high frequency signal will not cause objectionable artifacts if the recorded cassette is subsequently played back on a standard VCR. The luminance record circuit 20 records the Lr signal in exactly the same manner as the reduced bandwidth luminance signal is recorded in a standard VCR. In a VHS VCR, for example, this signal is FM modulated and occupies a band of frequencies around 1.4–5.9 MHz.

The encoder 10 also produces a composite signal C+Mr to be supplied to the chrominance record circuit 30. This composite signal includes the standard chrominance signal (C) as one component, and a motion representative signal (Mr) as another component. The motion representative signal component may be used to process the unfolded luminance signal during the playback processing, in a manner described below. The chrominance record circuit 30 records the C+Mr signal in exactly the same manner as the chrominance signal is recorded in a standard VCR. In a VHS VCR, this signal is modulated to about 629 kHz. This chrominance signal is combined with the luminance signal (described above) and recorded on the video tape in the cassette.

Figure 2:
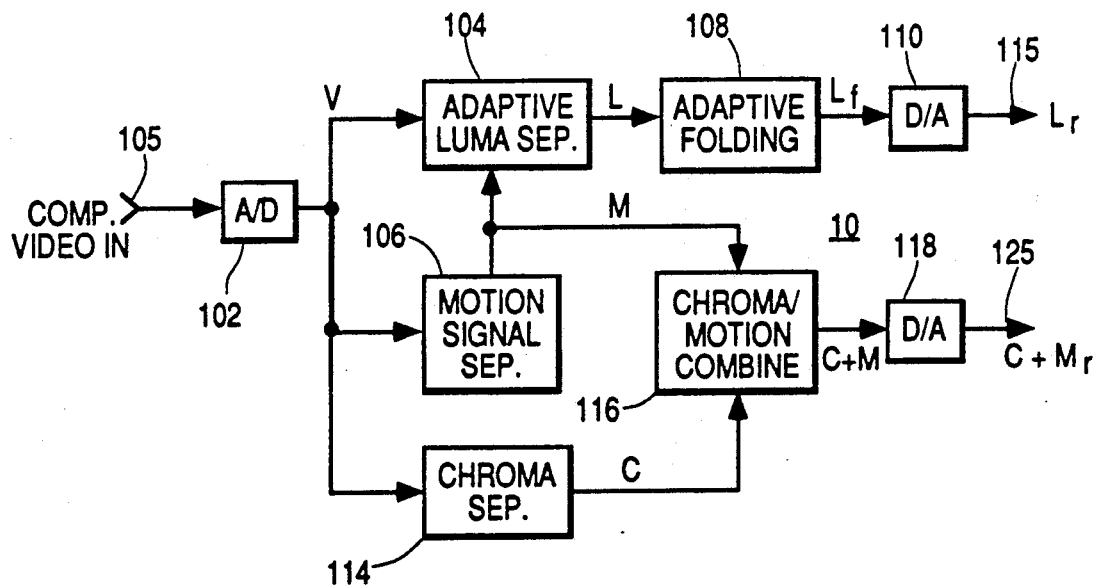
FIG. 2 is a block diagram of an encoder which may be a part of the record section of FIG. 1.

FIG. 2 is a more detailed block diagram of the encoder 10 illustrated in FIG. 1. In FIG. 2, an input terminal 105 is coupled to input terminal 5 (of FIG. 1). Input terminal 105 is coupled to an input terminal of an analog-to-digital converter (A/D) 102. An output terminal of A/D 102 is coupled to respective input terminals of an adaptive luminance signal separator 104, a motion signal separator 106 and a chrominance signal separator 114. An output terminal of the adaptive luminance signal separator 104 is coupled to an input terminal of an adaptive folding circuit 108. An output terminal of the adaptive folding circuit 108 is coupled to an input terminal of an digital-to-analog converter (D/A) 110. An output terminal of D/A 110 is coupled to a first output terminal 115. Output terminal 115 is coupled to the input terminal of the luminance record circuit 20 (of FIG. 1).

An output terminal of the motion signal separator 106 is coupled to a control input terminal of the adaptive luminance signal separator 104 and a motion signal input terminal of chrominance/motion signal combining circuit 116. An output terminal of the chrominance signal separator 114 is coupled to a chrominance signal input terminal of a chrominance/motion signals combining circuit 116. An output terminal of the chrominance/motion signal combining circuit 116 is coupled to an input terminal of a second digital-to-analog converter (D/A) 118. An output terminal of D/A 118 is coupled to an output terminal 125. Output terminal 125 is coupled to the input terminal of the chrominance record circuit 30 (of FIG. 1).

In operation, the encoder of FIG. 2 first converts the composite video signal at input terminal 105 to a sampled data multibit digital composite video signal V using A/D 102. The sampling frequency is selected in a manner more fully described below. For an NTSC signal, the sampling frequency may be selected to be about 10 MHz, for example. Signal V is supplied to the adaptive luminance separator 104, which extracts the luminance component L; to the motion signal separator 106, which extracts a motion representative signal M; and to a chrominance signal separator 114, which extracts the chrominance signal component.

The extracted luminance signal L is further processed by the adaptive folding circuit 108. This circuit folds attenuated high frequency components of the luminance signal L back into lower frequency components, and filters the resulting signal so that all the information in the full-bandwidth luminance signal L is contained in a folded luminance signal Lf which has a bandwidth of about 2.5 MHz. The adaptive folding circuit 108 will be described in more detail below. The folded luminance signal Lf is converted to an analog signal Lr in D/A 110. This signal is in a form which can be recorded on a video cassette by luminance recording circuitry 20 (of FIG. 1).

The extracted motion signal M and the extracted chrominance signal C are combined into a single composite signal C+M in the chrominance/motion signal combining circuit 116. A chrominance/auxiliary signal combining circuit, which may be used as the chrominance/motion signal combining circuit 116 is described in more detail in copending patent application Ser. No. 07/531,070 titled COLOR-UNDER CHROMA CHANNEL ENCODED WITH AUXILIARY SIGNALS, filed May 31, 1990, by inventor Strolle, et al. The C+M signal is converted into an analog signal C+Rr by D/A 118. This signal is in a form which can be recorded on a video cassette by standard chrominance recording circuitry 30 (of FIG. 1).

As is known in the video signal processing art, frame comb low pass filters (temporal low pass filters) may be used to extract the luminance component with no loss of spatial resolution. However, in the presence of motion, artifacts are introduced into the frame comb extracted luminance signal. Line comb low pass filters (vertical comb low pass filters) may also be used to extract the luminance component, even in the presence of motion. However, luminance extracted by line combing has decreased diagonal resolution. It is preferable to extract the luminance signal using frame comb filtering, unless there is motion in an area of the image, in which case, it is preferable to use line comb filtering in that area.

Figure 3:
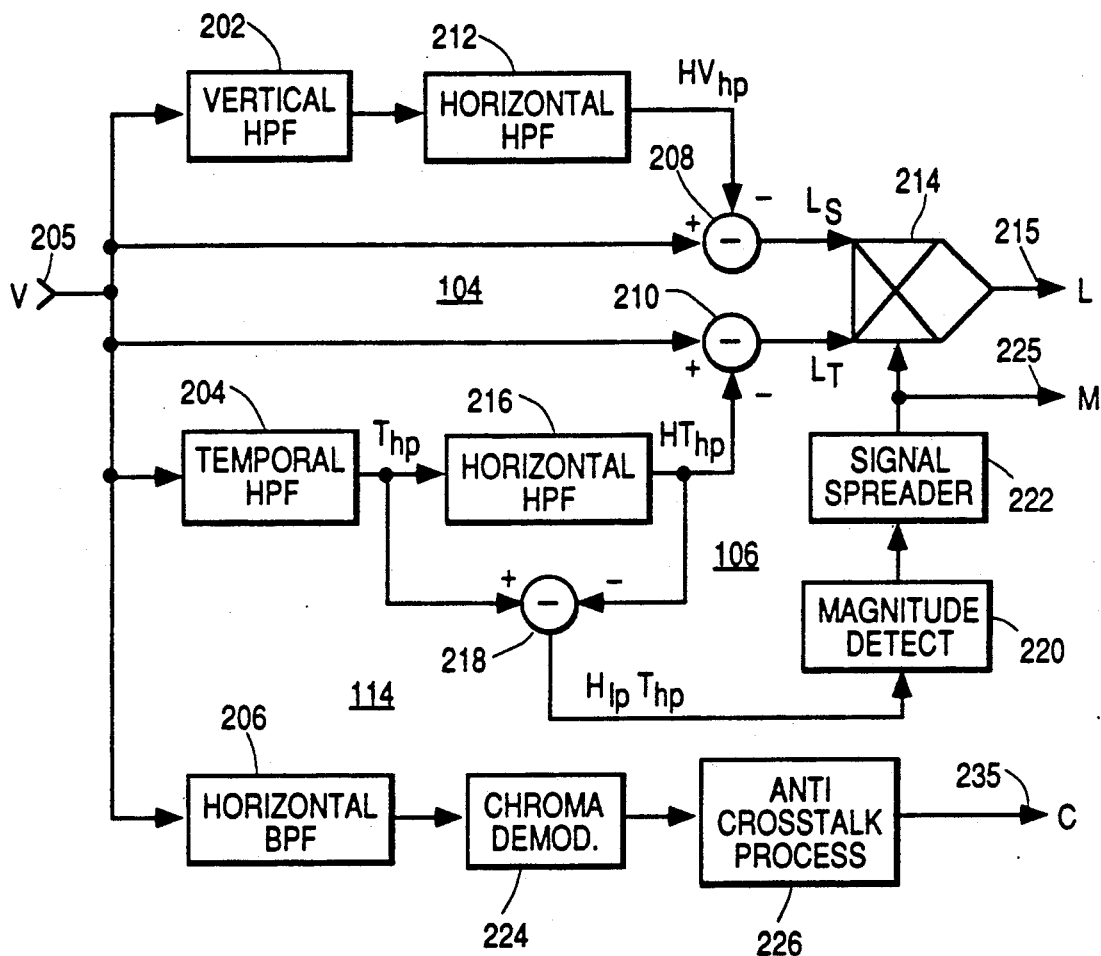
FIG. 3 is a more detailed block diagram of a portion of the encoder illustrated in FIG. 2.

FIG. 3 is a more detailed block diagram of a portion of encoder 10 illustrated in FIG. 2. In FIG. 3, an input terminal 205 is coupled to the output terminal of the A/D 102 (of FIG. 2). Input terminal 205 is coupled to respective input terminals of a vertical high pass filter (HPF) 202, a temporal high pass filter (HPF) 204, a horizontal band pass filter (BPF) 206 and to respective minuend input terminals of subtractors 208 and 210. An output terminal of the vertical HPF 202 is coupled to an input terminal of a horizontal high pass filter (HPF) 212. An output terminal of horizontal HPF 212 is coupled to a subtrahend input terminal of subtractor 208. An output terminal of subtractor 208 is coupled to a first data input terminal of a soft switch 214. An output terminal of soft switch 214 is coupled to an output terminal 215. Output terminal 215 is coupled to the input terminal of the adaptive folding circuit 108 (of FIG. 2).

An output terminal of temporal HPF 204 is coupled to an input terminal of a horizontal high pass filter (HPF) 216 and to a minuend input terminal of a subtractor 218. An output terminal of horizontal HPF 216 is coupled to respective subtrahend input terminals of subtractors 210 and 218. An output terminal of subtractor 210 is coupled to a second data input terminal of soft switch 214.

An output terminal of subtractor 218 is coupled to an input of a signal magnitude detector 220. An output terminal of magnitude detector 220 is coupled to an input terminal of signal spreader 222. An output terminal of signal spreader 222 is coupled to an output terminal 225 and to a control input terminal of soft switch 214. Output terminal 225 is coupled to the motion signal input terminal of chrominance/motion signal combining circuit 116 (of FIG. 2).

An output terminal of horizontal BPF 206 is coupled to an input terminal of a chrominance signal demodulator 224. An output terminal of chrominance signal demodulator 224 is coupled to an input terminal of an anti-crosstalk processor 226. An output terminal of anti-crosstalk processor 226 is coupled to an output terminal 235. Output terminal 235 is coupled to a chrominance signal input terminal of chrominance/motion signal combining circuit 116 (of FIG. 2).

In operation, horizontally and vertically high pass filtered signal HVhp, produced by the serially coupled vertical HPF 202 and horizontal HPF 212, contains all the chrominance information present in the composite video signal V in addition to all the spatial detail information. This information is subtracted from the composite video signal by subtractor 208, to produce a spatially derived luminance signal. The spatially derived luminance signal LS, produced by subtractor 208, therefore, contains only luminance information, but has reduced diagonal resolution. Temporally and horizontally high pass filtered signal HThp, produced by the serially coupled temporal HPF 204 and horizontal HPF 216, also contains all the chrominance information present in the composite video signal V, in addition to all the temporal detail information. This information is subtracted from the composite video signal by subtractor 210, to produce a temporally derived luminance signal Lt. The temporally derived luminance signal LT, produced by subtractor 210, therefore, contains only luminance information at full spatial resolution, but has reduced temporal resolution.

The temporally high pass filtered signal Thp from the temporal HPF 204 contains motion information, at horizontal low frequencies and chrominance information at high luminance frequencies. Thus, the output signal from the horizontal HPF is subtracted from the temporally high pass filtered signal Thp to form a horizontal low pass filtered, temporally high pass filtered signal HlpThp, which is a bipolar motion representative signal. This signal varies as a function of both the magnitude of the motion in the image (that is, the faster the motion, the larger the signal) and the contrast of the moving portions of the image. This signal has greatest magnitude at the edges of objects having large contrast with respect to the background against which it is moving. Where the background and moving object are close in intensity, this motion signal is weak. In addition, quick moving objects with soft edges also produce a weak motion signal. Finally, even with quick moving high contrast objects, the motion signal is usually only strong within several pixels of the moving edge.

In order to minimize the effect of these variations in the motion signal, magnitude detector 220 detects the magnitude of the motion signal from the subtractor 218 and produces a single bit signal indicating either the presence or absence of motion for that pixel. A known magnitude detector 220 may include a multiplexer having a control input terminal responsive to a sign bit of the applied motion signal. The motion signal HlpThp would be coupled to a first input terminal of the multiplexer and an input terminal of an arithmetic negator circuit. An output terminal of the arithmetic negator circuit would be coupled to a second input terminal of the multiplexer. The output terminal of the multiplexer produces the magnitude (absolute value) of the motion signal. If the sign bit is a logic '0', indicating, for example, that the motion signal value is positive, then the multiplexer couples the first input terminal, carrying the motion signal, to the output terminal. If the sign bit is a logic '1', indicating that the motion signal value is negative, then the multiplexer couples the second input terminal, carrying the arithmetic negative of the motion signal (which would be a positive valued signal) to the output terminal.

This magnitude signal is then supplied to a known comparator circuit. The comparator circuit compares the magnitude signal to a predetermined threshold value. If the magnitude signal exceeds the threshold value, then the comparator circuit produces an output signal which is a logic '1' signal. If the magnitude signal is less than the threshold value, then the comparator circuit produces an output signal which is a logic '0' signal. The output of this comparator is a single bit signal which is a logic '1' in the presence of motion, and a logic '0' otherwise.

This single bit motion signal is spread vertically and horizontally by signal spreader 222. Alternatively, the signal may be spread temporally, vertically and horizontally by signal spreader 222. Apparatus for spreading such single bit motion representative signal is described in patent application Ser. No. 07/531,057, CONTROL SIGNAL SPREADER, filed May 31, 1990 by Ko et al. The spread motion signal M, produced by signal spreader 222, is a multibit digital signal whose value gradually decreases from a maximum value in moving areas (as indicated by the single-bit bilevel signal having a logic '1' value) to a zero valued signal in the area around the moving area in the vertical and horizontal directions (and optionally, temporally). This motion signal M is used by other portions of the encoder for adaptively processing the video signal V.

As described above, in the absence of motion, the luminance signal L is preferably the temporally derived luminance signal LT; but in the presence of motion, the luminance signal L is preferably the spatially derived luminance signal. Soft switch 214 will continuously vary the proportion of the two input signals LT and LS in response to the value of the motion signal M. If the value of the motion signal M is zero, or nearly zero, indicating no or a low level of motion, then the soft switch produces an output signal L which is completely LT. If the value of the motion signal M is at a maximum, or nearly maximum, indicating a high level of motion, then the soft switch 214 produces an output signal L which is completely LS. At intermediate values of the motion signal M, the output signal contains some proportion of each of the input signals LT and LS. The operation of soft switch 214 will be described in more detail below.

The modulated chrominance component C is extracted from the composite video signal V in a known manner using the horizontal BPF 206. The chrominance signal is demodulated to baseband by chrominance signal demodulator 224. The baseband chrominance signal is processed to reduce adjacent track crosstalk by anti-crosstalk element 226. Anti-crosstalk element 226 may be, for example, a vertical low pass filter, which may be implemented as a two-tap line comb low pass filter.

FIG. 3 illustrates a portion of encoder 10 which is preliminary applicable for processing an NTSC video signal. One skilled in the art would understand how to construct an encoder 10 in accordance with principles of the present invention for processing a PAL video signal a SECAM video signal or a video signal according to any other standard.

Figure 4:
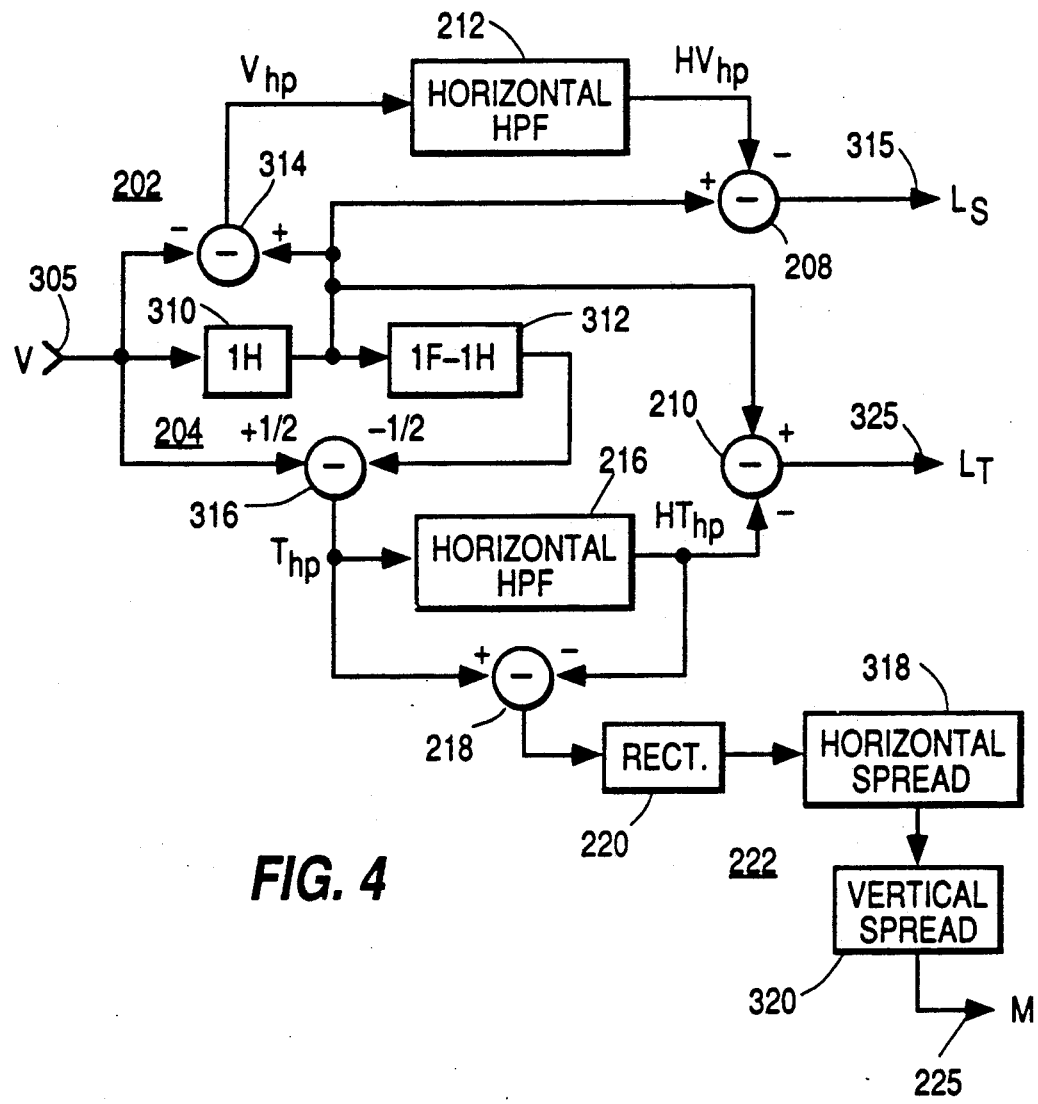
FIG. 4 is a more detailed block diagram of a portion of the encoder illustrated in FIG. 3.

In FIG. 3, the vertical HPF 202 and temporal HPF 204 are both responsive to the composite video signal V. Because they are implemented as comb filters they can share delay lines. FIG. 4 is a more detailed block diagram illustrating the apparatus of FIG. 3 in a more efficiently constructed form, sharing delay lines, whenever possible. In FIG. 4, elements which are the same as those in FIG. 3 have the same reference number, and are not described in detail below.

In FIG. 4, an input terminal 305 is coupled to the output terminal of A/D 102 (of FIG. 2). Input terminal 305 is coupled to a subtrahend input terminal of a subtractor 314, a minuend input terminal of a weighted subtractor 316 whose input is weighted by ½, and an input terminal of serially coupled delay devices 310 and 312. Delay device 310 produces a signal at its output terminal which is the signal at its input terminal delayed by a period of time equal to one horizontal scan period (1H). Delay device 312 produces a signal at its output terminal which is the signal at its input terminal delayed by a period of time equal to one frame scan period less one horizontal scan period (1F−1H). An output terminal of 1F−1H delay device 312 is coupled to a subtrahend input terminal of weighted subtractor 316, whose input is weighted −½. The combination of delay devices 310 and 312 and weighted subtractor 318 forms temporal HPF 204 as a two-tap frame high pass comb filter of known design.

An output terminal of 1H delay device 310 is coupled to a minuend input terminal of subtractor 314. The combination of 1H delay device 310 and subtractor 314 forms vertical HPF 202 as a two tap line comb filter of known design.

An output terminal of subtractor 218 is coupled to serially coupled rectifier 220, horizontal spreader 318 and vertical spreader 320. The combination of rectifier 220, horizontal spreader 318 and vertical spreader 320 forms signal spreader 222 (of FIG. 3) and operates as described above except that FIG. 3 does not purport to show timing accuracy.

The remainder of FIG. 4 is the same as illustrated in a portion of FIG. 3 and described above. The horizontal HPFs 212 and 216 may be a standard digital high pass filters each having a break frequency at around 2 MHz. A 15-tap horizontal comb high pass filter is preferred, yielding a response characteristic which is −6 dB at 1.75 MHz.

Figure 5:
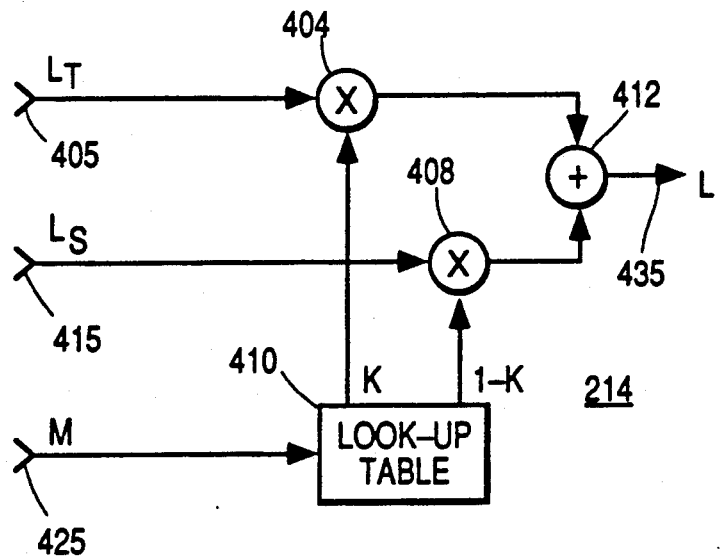
FIG. 5 is a more detailed block diagram of a portion of the encoder illustrated in FIG. 2.

FIG. 5 is a more detailed block diagram of the soft switch 214 illustrated in FIGS. 3 and 4. In FIG. 5, an input terminal 405 is coupled to the output terminal of subtractor 312 (of FIG. 3). Input terminal 405 is coupled to a first input terminal of a multiplier 404. An output terminal of multiplier 404 is coupled to a first input terminal of an adder 412. An output terminal of adder 412 is coupled to an output terminal 435. Output terminal is coupled to the adaptive folding circuit 108 (of FIG. 2).

An input terminal 415 is coupled to an output terminal of subtractor 208 (of FIG. 3). Input terminal 415 is coupled to a first input terminal of a multiplier 408. An output terminal of multiplier 408 is coupled to a second input terminal of adder 412. An input terminal 425 is coupled to an output terminal of signal spreader 222 (of FIG. 3). Input terminal 425 is coupled to an input terminal of look-up table 410. A first output terminal of look-up table 410 is coupled to a second input terminal of multiplier 404, and a second output terminal of look-up table 410 is coupled to a second input terminal of multiplier 408.

In operation, multiplier 404 scales the temporally derived luminance signal LT by the scaling factor K, and multiplier 408 scales the spatially derived luminance signal LS by the scaling factor 1−K. Adder 412 sums the two scaled signals to produce the luminance signal L.

The spread motion signal M from input terminal 425 is applied to the input of look-up table 410. Look-up table produces two scaling factors which are related to the value of the control signal M. The first scaling factor K is the proportion of the temporally derived luminance signal LT which should be in the luminance output signal L. The second scaling factor 1−K is the proportion of the spatially derived luminance signal LS which should be in the luminance output signal L. The sum of K and 1−K is one. The function K(M) is selected such that when M is zero or nearly zero (low level of motion), K is one (all temporally derived luminance) and 1−K is zero (no spatially derived luminance); and when M is maximum or nearly maximum (high level of motion), K is zero (no temporally derived luminance) and 1−K is one (all spatially derived luminance). The function K(M) is continuous and may be linear or non-linear. As the value of the motion signal M gradually changes from zero to maximum, the proportion of the temporally derived luminance signal LT gradually decreases and the proportion of the spatially derived luminance signal LS gradually increases.

Look-up table 410 may be implemented in known manner as a multibit read-only memory (ROM) having input terminal 425 coupled to its address input terminals. A first subset of its data output terminals are coupled to the K signal input terminal of multiplier 404, and a second subset are coupled to the $1-K$ signal input terminal of multiplier 408.

In operation, the storage locations of the ROM are accessed by the motion signal M at the address input terminals where each separate value which the M signal can assume accesses a different storage location. Each storage location has a first portion (which is coupled to the first subset of data output terminals) preprogrammed with the K value corresponding to the M value which accesses that location, and a second portion (which is coupled to the second subset of data output terminals) preprogrammed with the $1-K$ value corresponding to that value of the motion signal M.

Figure 6:
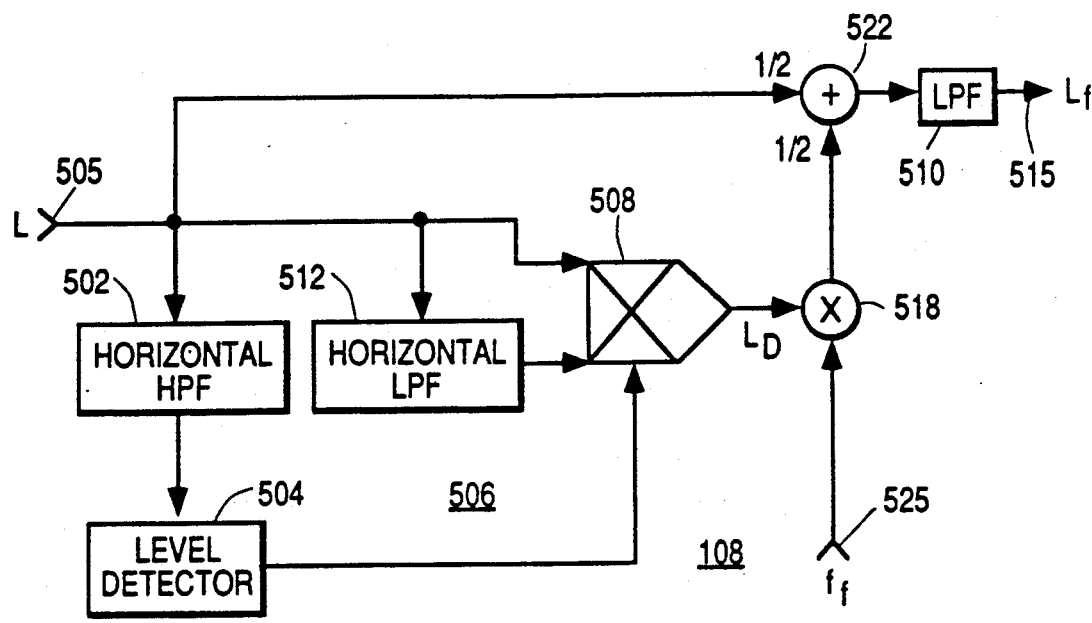
FIG. 6 is a block diagram of an adaptive folding circuit which is a part of the encoder of FIG. 2.

FIG. 6 is a block diagram of the adaptive folding circuit 108 as illustrated in FIG. 2. In FIG. 6, an input terminal 505 is coupled to the output terminal of the adaptive luminance separator 104 (of FIG. 2). Input terminal 505 is coupled to an input terminal of a horizontal high pass filter (HPF) 502, an input terminal of a horizontal low pass filter (LPF) 512, a first input terminal of a weighted adder 522 whose input signal is weighted by $\frac{1}{2}$ and a first data input terminal of a soft switch 508. An output terminal of the soft switch 508 is coupled to a data input terminal of a modulator 518. An output terminal of modulator 518 is coupled to a second input terminal of weighted adder 522 whose input signal is weighted by $\frac{1}{2}$. An output terminal of the weighted adder 522 is coupled to an input terminal of low pass filter (LPF) 510. An output terminal of LPF 510 is coupled to output terminal 515. Output terminal 515 is coupled to D/A 110 (of FIG. 2).

An output terminal of horizontal HPF 502 is coupled to an input terminal of level detector 504. An output terminal of level detector 504 is coupled to a control input terminal of the soft switch 508. An output terminal of the horizontal LPF 512 is coupled to a second data input terminal of the soft switch 508.

An input terminal 525 is coupled to a source (not shown) of a folding carrier signal having a frequency ff. Input terminal 525 is coupled to a clock signal input terminal of the modulator 518.

As described above, in prior art luminance signal folding systems, the luminance high frequencies are folded back into the luminance low frequencies at the same amplitude or higher. When played back on a VCR which had no provision for removing these folded high luminance frequencies, highly objectionable artifacts were present on reproduced images.

The combination of the horizontal HPF 502, level detector 504, horizontal LPF 512 and soft switch 508 forms an adaptive depeaker 506 which reduces the amplitude of the luminance high frequencies to a level such that if reproduced on a VCR which had no provision for removing them, the artifacts do not produce an unacceptable image. The adaptive depeaker 506 produces a depeaked luminance signal LD.

The adaptive depeaker operates in the following manner. Horizontal HPF 502 extracts the high frequency luminance component. The level of the luminance high frequencies is detected in the level detector 504. The level detector 504 operates in a known manner as an envelope detector to produce a signal which has the value of the maximum amplitude of the high frequency luminance signal.

Soft switch 508 may be constructed in the same manner as soft switch 214 (of FIG. 3), including multipliers for scaling each data signal, an adder for summing the scaled data signals, and a look-up table for generating the scaling factors in response to the control signal.

The horizontal LPF 512 produces a signal in which the luminance high frequencies are attenuated relative to the luminance low frequencies. When the level of luminance high frequencies, as detected by level detector 504, is zero or nearly zero, then the high frequencies do not need to be attenuated, and the output signal LD from soft switch 508 is completely from input terminal 505 carrying the unfiltered luminance signal L. As the level of luminance high frequencies increases, the luminance high frequencies need to be attenuated. In this situation, the proportion of unfiltered luminance signal L decreases in the output signal LD from the soft switch 508 and the proportion of low pass filtered luminance signal increases. When the level of luminance high frequencies is maximum or nearly maximum, then the high frequencies need to be attenuated to the maximum extent and the output signal LD from soft switch 508 is completely from the horizontal LPF 512. The values of K and $1-K$ (as illustrated in FIG. 5, and discussed in the corresponding text) are selected to perform the above described depeaking operation.

The depeaked luminance signal LD is then modulated about a folding carrier having a frequency ff in modulator 518. The folding frequency is selected so as to maximize the distance between the folding carrier and the baseband luminance signal in the temporal, vertical and horizontal directions. The folding carrier is preferably placed at one-half the maximum vertical frequency, and one-half the maximum temporal frequency (i.e. in the so-called Fukinuki hole) in the temporal and vertical dimensions, and at about 5 MHz in the horizontal directions. This maximizes the spectral distance between the folding carrier and the vertical and temporal lower frequency components of the luminance signal.

Modulator 518 may be a standard four quadrant multiplier, or, if the sampling frequency is properly selected, a $+1, -1$ type modulator. A $+1, -1$ type modulator modulates a sampled signal by a frequency equal to one-half the sampling frequency by arithmetically negating every other sample. For example, if the sampling frequency is selected to be at about 10 MHz, then the folding frequency will be about 5 MHz, with the actual frequency selected so as to satisfy the above criteria relating to vertical and temporal spectral distance from vertical and temporal DC. The output signal contains a component of one-half the sampling frequency, and upper and lower sidebands centered around one-half the sampling frequency containing the spectral information contained in the input signal.

Such a modulator, having data input and output terminals and a clock input terminal, may be constructed using a multiplexer having a first data input terminal coupled to the data input terminal of the modulator. An arithmetic negator is also coupled to the data input terminal of the modulator. An output terminal of the arithmetic negator is coupled to a second data input terminal of the multiplexer. An output terminal of the multiplexer is coupled to the output terminal of the modulator. A folding clock signal, which has a frequency equal to one-half the sampling clock frequency, is coupled to the clock input terminal of the modulator, which is coupled to the control input terminal of the multiplexer. This signal alternates between a logic '1' value and a logic '0' value at the sampling frequency, and may be generated by a flip-flop coupled to the sampling clock signal.

In operation, when the folding clock signal is a logic '1' signal, then the multiplexer couples the non-negated signal from the input terminal of the modulator to its output terminal. When the folding clock signal is a logic '0' signal, then the multiplexer couples the negated signal from the arithmetic negator to its output terminal. In this fashion, a modulated signal is reproduced. The lower sideband of the modulated signal contains a spectral image of the 4.2 MHz bandwidth depeaked luminance signal but inverted in frequency. That is, the depeaked luminance signal is folded about the folding frequency—low depeaked baseband luminance frequencies are folded into the neighborhood of 5 MHz, and high depeaked baseband luminance frequencies of 4.2 MHz, for example, are folded into the neighborhood of 800 kHz.

The folded depeaked luminance signal is then combined with the baseband luminance signal in weighted adder 522. This composite signal is then low pass filtered by LPF 510, which has a passband narrow enough to eliminate all of the signal which would not pass through the narrow-band channel. For a VCR, the passband of LPF 510 would be about 2.5 MHz.

The horizontal HPF 502 and horizontal LPF 512 are both responsive to the same luminance signal L and may share delay line elements in the same manner as the filters 202 and 204 share common delay line elements, as illustrated in FIG. 4. One skilled in the art of video signal processor design would understand how to design such filters sharing delay line elements.

Figure 7:
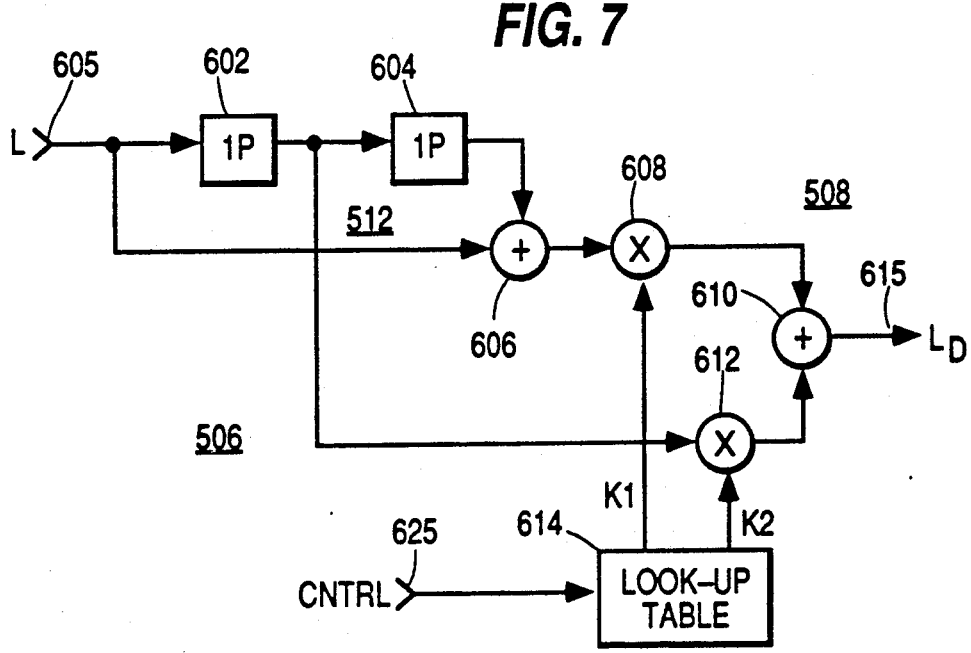
FIG. 7 is an alternative embodiment of a portion of the adaptive folding system illustrated in FIG. 6.

FIG. 7 is an alternative embodiment of a portion of the adaptive depeaker 506 illustrated in FIG. 6. In FIG. 7, an input terminal 605 is coupled to the output terminal of the adaptive luminance signal separator 104 (of FIG. 2). Input terminal 605 is coupled to a first input terminal of an adder 606 and an input terminal of serially coupled single pixel period (1P) delay devices 602 and 604. An output terminal of 1P delay device 602 is coupled to a first input terminal of a multiplier 612. An output terminal of multiplier 612 is coupled to a first input terminal of an adder 610. An output terminal of adder 610 is coupled to an output terminal 615. Output terminal 615 is coupled to the input terminal of the modulator 518 (of FIG. 6).

An output terminal of 1P delay device 604 is coupled to a second input terminal of adder 606. An output terminal of adder 606 is coupled to a first input terminal of multiplier 608. An output terminal of multiplier 608 is coupled to a second input terminal of adder 610.

An input terminal 625 is coupled to the output terminal of level detector 504 (of FIG. 6). Input terminal 625 is coupled to an input terminal of a look-up table 614 (which may also be implemented in a ROM, as described above). First and second output terminals of look-up table 614 are coupled to respective second input terminals of multipliers 608 and 612.

The operation of the portion of the depeaker 506 illustrated in FIG. 7 differs from that illustrated in FIG. 6 in the cooperation between the soft switch 508 and the horizontal LPF 512. In a depeaker, the level of the high frequencies in the input signal is lowered in the output signal. In the embodiment illustrated in FIG. 6, this is done by varying the proportion of low pass filtered luminance signal and unfiltered luminance signal in the output signal LD. In FIG. 7, the horizontal LPF 512 and the soft switch 508 share adders 606 and 610.

In a standard three tap low pass comb filter, the input and output taps of the serially coupled delay devices each receive a weight of ¼, and the center tap receives a weight of ½ before they are added together to generate the low pass filtered signal. In the case of a depeaker, some proportion of the center tap signal, representing the unfiltered input signal, suitably delayed for combination with the low pass filtered signal, is added to the low pass filtered signal. These two operations may be performed by the same scaling and combining elements.

Adder 606 sums the input and output taps of the serially coupled delay devices. (It makes no difference whether each of the input and output taps are weighted by ¼ then they are summed, or the input and output taps are summed then the sum is weighted by ¼). This sum is then weighted by the multiplier 608, which receives weighting factor K1 from the look-up table 614. The center tap is weighted by multiplier 612, which receives weighting factor K2 from the look-up table 614. These weighting factors are not related by K2 being equal to 1−K1, as in the soft switch illustrated in FIG. 5.

Instead, when a zero or low level of luminance high frequencies is detected by level detector 504 (of FIG. 6), then the unfiltered luminance signal is desired. In this case scaling factor K1 is zero and scaling factor K2 is one. The sum of the scaled signals is produced by adder 610, which, in this case, is the unfiltered luminance signal L. When a maximum or nearly maximum level of luminance high frequencies is detected by level detector 504, then the low pass filtered luminance signal is desired. In this case scaling factor K1 is ¼ and scaling factor K2 is ½. As the level of luminance high frequencies gradually increases from zero to maximum, scaling factor K1 changes in a continuous manner from one to ½, and scaling factor K2 changes in a continuous manner from zero to ¼. In this manner, the output signal of the adaptive peaker has the proportions of unfiltered and low pass filtered luminance signals gradually varied in a continuous manner in response to the level of luminance high frequencies.

In the above description, the response characteristic of the three tap low pass comb filter was a simple raised cosine. Different weighting factors could be preprogrammed into a ROM implementation of the look-up table 614 to implement different response characteristics for the low pass comb filter 512. In addition, the widths of the deadbands at the zero and maximum luminance high frequency levels, and the characteristic of the continuous change in proportions of the unfiltered and low pass filtered luminance signal in response to the level of luminance high frequencies may be varied.

The apparatus described above may be used to record a full-bandwidth video signal on a standard video cassette, which may then be played back on a standard VCR, without objectionable artifacts. Apparatus described below may be used for extracting the luminance high frequencies folded into the luminance low frequencies and regenerating the full bandwidth video signal upon playback of such a previously recorded video cassette.

Figure 8:
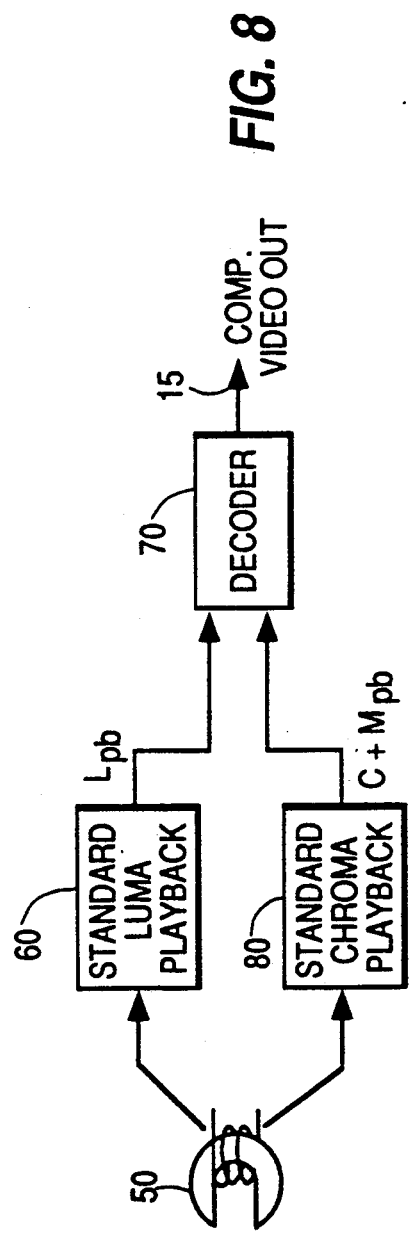
FIG. 8 is a block diagram of a playback section of a video recorder according to principles of the present invention.

FIG. 8 is a block diagram of a playback system in accordance with the present invention. In FIG. 8, a playback head 50 is incorporated in a standard tape transport (not shown) of a standard VCR. Playback head 50 is coupled to respective input terminals of a luminance signal playback circuit 60 and a chrominance signal playback circuit 80. An output terminal of luminance signal playback circuit 60 is coupled to a first input terminal of a decoder 70, and an output terminal of chrominance signal playback circuit 80 is coupled to a second input terminal of decoder 70. An output terminal of decoder 70 is coupled to an output terminal 15. Output terminal 15 is coupled to utilization circuitry (not shown) which may be, for example, a television receiver for reproducing the images previously recorded on the video cassette, or a Y-C output jack such as is in a super-VHS VCR.

In operation, playback head 50 supplies its signal to both the luminance playback circuit 60 and the chrominance playback circuit 80, in the known manner. The previously recorded folded luminance signal occupies a band of frequencies at around 1.4–5.9 MHz, and previously recorded chrominance plus motion signal occupies a 1 MHz band of frequencies at around 629 kHz. The luminance playback circuitry processes the folded luminance signal in the usual manner to produce the playback folded luminance signal Lpb. The chrominance playback circuitry processes the chrominancea plus motion signal to produce the playback chrominance plus motion signal C+Mpb. These signals are then processed by the decoder 70 which extracts the motion signal from the chrominance signal, and uses it to aid in unfolding the folded high frequency luminance component and reconstructing the full bandwidth luminance signal. The reconstructed full bandwidth luminance signal and the chrominance signals are then combined to form a composite video signal at output terminal 15.

Figure 9:
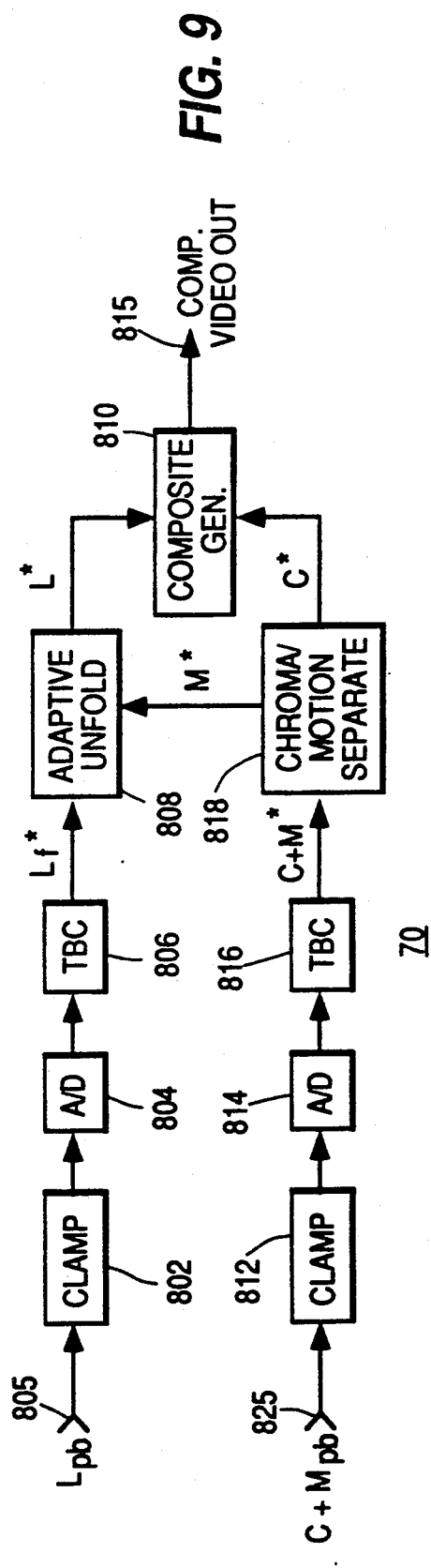
FIG. 9 is a more detailed block diagram of a decoder in the playback section illustrated in FIG. 8.

FIG. 9 is a more detailed block diagram of the decoder 70 illustrated in FIG. 8. In FIG. 9, an input terminal 805 is coupled to the output terminal luminance playback circuit 60 (of FIG. 8). Input terminal 805 is coupled to an input terminal of a clamping circuit 802. An output terminal of clamping circuit 802 is coupled to an input terminal of an analog-to-digital converter (A/D) 804. An output terminal of A/D 804 is coupled to an input terminal of time base corrector (TBC) 806. An output terminal of TBC 806 is coupled to a data input terminal of an adaptive unfolding circuit 808. An output terminal of adaptive unfolding circuit 808 is coupled to a first input terminal of composite video signal generator 810. An output terminal of composite video signal generator 810 is coupled to an output terminal 815. Output terminal 815 is coupled to utilization circuitry (not shown) which, for example, may be a television receiver for reproducing the images which were previously recorded on the cassette or a Y-C output jack.

An input terminal 825 is coupled to the output terminal of the chrominance playback circuit 80 (of FIG. 8). Input terminal 825 is coupled to an input terminal of a clamping circuit 812. An output terminal of clamping circuit 812 is coupled to an input terminal of an analog-to-digital converter (A/D) 814. An output terminal of A/D 814 is coupled to an input terminal of a time base corrector (TBC) 816. An output terminal of TBC 816 is coupled to an input terminal of a chrominance/motion signal separator 818. A first output terminal of the chrominance/motion signal separator 818 is coupled to a second input terminal of the composite video signal generator 810. A second output terminal of the chrominance/motion signal separator 818 is coupled to a control input terminal of the adaptive unfolding circuit 808.

In operation, the upper elements in FIG. 9 operate to extract the full-bandwidth luminance signal from the reduced bandwidth luminance signal previously recorded on the cassette. Clamp 802 operates in a known manner to clamp the black level of the recovered luminance signal to a predetermined digital value in the A/D 804. For example, the black level could be clamped to a digital signal of 16, for an A/D which has the dynamic range of from 0 to 255. A/D 804 produces a sampled multibit digital signal representing the playback folded luminance signal. The TBC 806 operates to correct any timing inaccuracies which are introduced by jitter in the tape mechanism or any other source of timing inaccuracy, and produces the recoved folded luminance signal Lf* (where * indicates a playback signal representing the same signal as previously recorded on the cassette).

The lower elements in FIG. 9 operate to extract the chrominance plus motion signal previously recorded on the cassette. The chrominance plus motion signal is a bidirectional signal, so the zero voltage of this signal is clamped to a digital signal of 128 out of 255 in clamping circuit 812. The A/D 814 produces a sampled multibit digital signal representing the chrominance plus motion signal and the TBC 816 operates to correct any timing inaccuracies in this signal, and produces the recovered chrominance plus motion signal C+M*.

When recorded, the chrominance signal and the luminance were in phase synchronism. However, they are passed through two separate independent paths in the record circuitry (illustrated in FIG. 1) and are frequency division multiplexed on the cassette. This separate processing may introduce phase inaccuracies between the two signals which are not compensated for in the two separate TBCs 806 and 816. U.S. Pat. No. 5,083,197, APPARATUS FOR RESTORING THE CORRECT PHASE RELATION OF THE CHROMA AND LUMINANCE SIGNALS PASSED THROUGH SEPARATE PATHS, filed May 31, 1990 by Ko et al., describes in detail apparatus for restoring the proper phase relationship between the chrominance and luminance signals.

Chrominance/motion separator 818 processes the recovered chrominance plus motion signal C+M* to produce a recovered motion signal M*, which is supplied to the control input terminal of the adaptive unfolding circuit 808, and chrominance signal C*, which is supplied to the chrominance signal input terminal of the composite video signal generator 810. Previously mentioned patent application Ser. No. 01/531070 describes in detail a chrominance/auxiliary signal separator which may be used as chrominance/motion signal separator 818, and this circuit will not be described in more detail here.

The adaptive unfolding circuit 808 unfolds the luminance high frequencies which were previously folded into the luminance low frequencies, and restores the full bandwidth luminance signal L*. This full bandwidth signal L* is supplied to the luminance signal input terminal of the composite video signal generator 810. Composite video signal generator 810 operates in a known manner to combine the luminance signal L* and chrominance signal C* to form a standard composite video signal. This signal may be used by any equipment which utilizes such a signal, for example, a television receiver.

Figure 10:
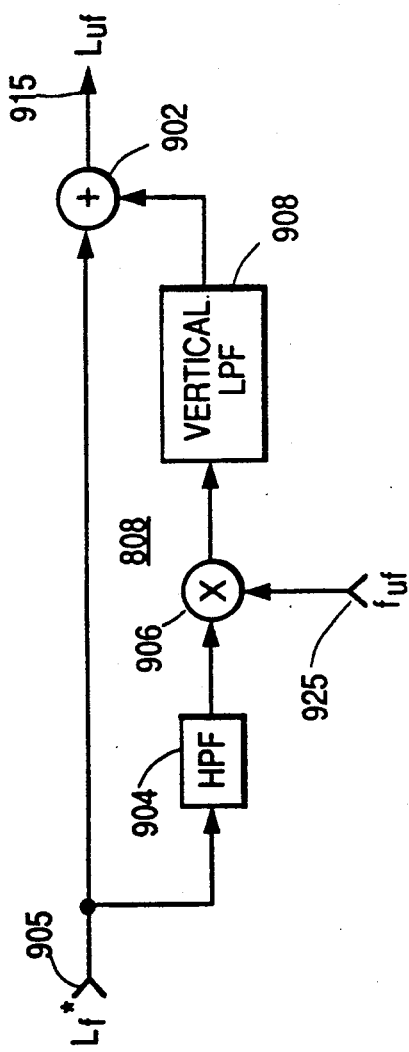
FIG. 10 is a more detailed block diagram of a portion of an adaptive unfolding circuit illustrated in FIG. 9.

FIG. 10 is a more detailed block diagram of a portion of an adaptive unfolding circuit 808 as illustrated in FIG. 9. In FIG. 10, an input terminal 905 is coupled to an output terminal of the time base corrector 806 (of FIG. 9). Input terminal 905 is coupled to an input terminal of a high pass filter (HPF) 904 and a first input terminal of an adder 902. An output terminal of adder 902 is coupled to an output terminal 915. Output terminal 915 produces the unfolded luminance signal Luf, which is supplied to the remainder of the adaptive unfolding circuit illustrated in FIG. 11 (below).

An output terminal of HPF 904 is coupled to an input terminal of a modulator 906. An output terminal of modulator 906 is coupled to an input terminal of a vertical low pass filter (LPF) 908. An output terminal of vertical LPF is coupled to a second input terminal of adder 902. An input terminal 925 is coupled to a source (not shown) of an unfolding carrier signal fuf. Input terminal 925 is coupled to a second input terminal of modulator 906.

In operation, input signal Lf* is the limited bandwidth folded luminance signal. The horizontal HPF filters out the frequencies below the folded luminance signal containing the chrominance information. When the wideband luminance signal is folded around the folding carrier at about 5 MHz by the record circuitry, the highest frequency luminance signal, at about 4.2 MHz is folded to about 800 kHz. Thus, the break frequency of the horizontal HPF is preferably about 750 kHz. This high pass filtered signal is then unfolded around the unfolding frequency which is about 5 MHz (where the actual frequency is selected in accordance with the criteria described above in the description of modulator 518 of FIG. 6) by the modulator 906. As is the case with modulator 518 (of FIG. 6), modulator 906 may be constructed in a known manner using a four quadrant multiplier, or may be a +1,−1 type modulator using a clock signal at one-half the sampling frequency, which in this example may be at about 10 MHz.

The demodulated signal from modulator 906 is then filtered by the vertical LPF 908. The processing performed by vertical LPF 908 may also be described as averaging, which increases the signal-to-noise ratio of the resulting signal. This signal is added to the received folded luminance signal Lf* from input terminal 905 in adder 902. The resulting unfolded signal Luf consists of a full bandwidth unfolded luminance signal centered around temporal, vertical and horizontal DC, and an image of the full bandwidth luminance signal centered about the unfolding carrier which has frequency at one-half the maximum temporal frequency, one-half the maximum vertical frequency and at a horizontal frequency of about 5 MHz. This image of the luminance signal must be removed.

Figure 11:
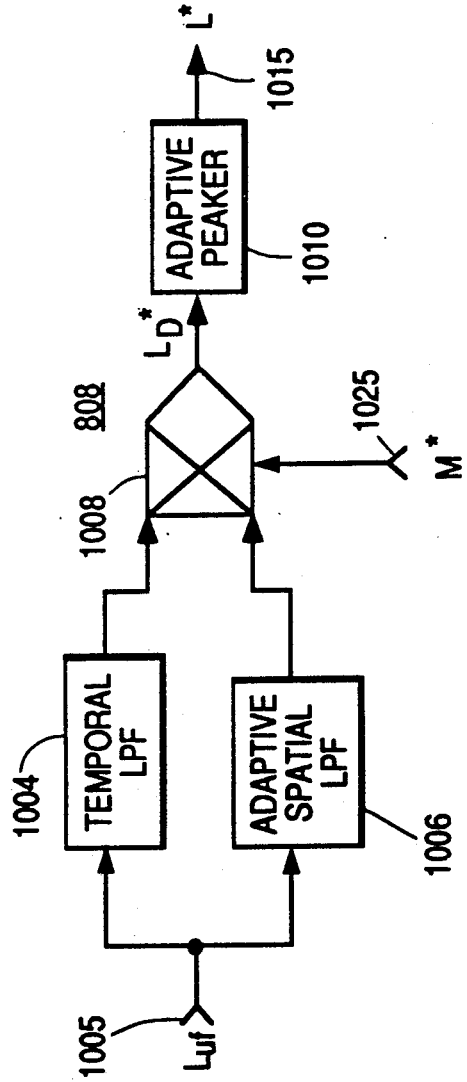
FIG. 11 is a more detailed block diagram of another portion of the adaptive unfolding circuit illustrated in FIG. 9.

FIG. 11 is a more detailed block diagram of a second portion of an adaptive unfolding circuit 808 illustrated in FIG. 9. In FIG. 11, an input terminal 1005 is coupled to the output terminal of adder 902 (of FIG. 10). Input terminal 1005 is coupled to respective input terminals of a temporal low pass filter LPF 1004 and an adaptive spatial LPF 1006. An output terminal of temporal LPF 1004 is coupled to a first data input terminal of soft switch 1008. An output terminal of soft switch 1008 is coupled to an input terminal of an adaptive peaker circuit 1010. An output terminal of adaptive peaker circuit 1010 is coupled to an output terminal 1015. Output terminal 1015 is coupled to the luminance signal input terminal of the composite video signal generator 810 (of FIG. 9).

An output terminal of adaptive spatial LPF 1006 is coupled to a second data input terminal of soft switch 1008. An input terminal 1025 is coupled to the motion signal output terminal of the chrominance/motion signal separator 818 (of FIG. 9). Input terminal 1025 is coupled to a control input terminal of soft switch 1008.

As described above with respect to the folding carrier, the unfolding carrier frequency is selected to maximize the distance between the baseband luminance signal and the luminance image signal in the temporal, vertical and horizontal directions. But the spectral characteristics of the recorded luminance signal effect the spectral shape of the unfolded luminance signal and the image signal. Thus, the spectral characteristics of the recorded luminance signal must be used to adaptively filter out the image signal and leave only the full bandwidth unfolded luminance signal.

When the level of motion is low, the unfolded luminance signal lies at temporal low frequencies (close to temporal DC), and the luminance image signal lies close in the temporal direction to the unfolding carrier, which was selected to be far away from temporal DC. In the presence of motion, the luminance signal occupies a wider temporal bandwidth. In this case the image may overlap temporally with the unfolded luminance signal, and the image must be removed spatially.

Adaptive spatial LPF 1006 operates to adaptively spatially separate the unfolded luminance signal from the luminance image signal by adaptively spatially filtering the unfolded luminance signal Luf. Patent application Ser. No. 07/562907, IMPROVING THE REMOVAL OF THE FOLDING CARRIER AND SIDEBANDS FORM AN UNFOLDED VIDEO SIGNAL, filed August, 1990, by 562,907 Strolle et al. describes in more detail an adaptive spatial LPF which may be used as the adaptive spatial LPF 1006 is FIG. 10, and it will not be discussed in more detail here.

Soft switch 1008 controls the proportion of the temporally separated and adaptively spatially separated unfolded full bandwidth luminance signals to be included in the unfolded luminance signal in response to the recovered motion control signal M*. When the level of motion is zero or nearly zero, the output of the soft switch 1008 is completely from the temporal LPF 1004. As the magnitude of motion gradually increases, the proportion of the input from the temporal LPF 1004 decreases and the proportion of the input from the adaptive spatial LPF 1006 increases. In the presence of relatively high levels of motion, the output from the soft switch 1008 is from the adaptive spatial LPF 1006.

The output from soft switch 1008 is a depeaked luminance signal LD*. (This signal was depeaked to attenuate the luminance high frequencies to allow for backward compatibility.) This signal is then adaptively peaked in adaptive peaker circuit 1010. Adaptive depeaker 506 (of FIGS. 6 or 7) operated to provide no depeaking when the high frequency component of the luminance signal was zero or nearly zero, and provided maximum depeaking when the high frequency component was at a relatively high level. Conversely, when the level of the high frequency component of the depeaked luminance signal is zero or nearly zero, then no depeaking was performed and no peaking is necessary. When the level of the high frequency component of the depeaked luminance signal is higher, then some depeaking was performed and some peaking is necessary.

In a peaker, some amount of the high frequency portion of a signal is added back to a signal. In this case a peaker must be used to boost the attenuated luminance high frequencies to restore to their original level before the attenuation.

Adaptive peaker 1010 may be constructed in a similar manner as the adaptive depeaker 506 (of FIGS. 6 or 7). In one embodiment of an adaptive peaker as illustrated in FIG. 6, a horizontal high pass filter may be substituted for the horizontal low pass filter 512. In this embodiment, the frequency characteristics of the luminance high frequency detector HPF (502) may be different from the frequency characteristics of the peaking HPF (512). In a second embodiment, the horizontal LPF 512 may be eliminated and the output terminal of the horizontal HPF 502 may also be coupled to the second input terminal of the soft switch 508. In a third embodiment, the circuit illustrated in FIG. 7 may be modified to perform this function.

FIG. 7 illustrates a combination of a horizontal comb filter 512 and soft switch 508. In the description of FIG. 7, the scaling factors K1 and K2 from lookup table 614 supplied to the multipliers 608 and 612 were selected to have the comb filter 512 perform as a low pass filter. However, the look-up table 614 may also be preprogrammed to have the comb filter 512 perform as a high pass filter. A standard three tap high pass filter exhibiting a raised cosine frequency response has the outer taps weighted by $-\frac{1}{4}$ and the center tap weighted by $+\frac{1}{2}$. Thus if the look-up table 614 were properly preprogrammed, the comb filter 512 could operate as a high pass filter.

Referring now to FIG. 6, in the presence of zero high frequencies in the reconstructed luminance signal LD*, the level detector 504 generates a zero valued signal. In the presence of a maximum level of high frequencies, level detector 504 generates a maximum signal. Referring again to FIG. 7, when the detected level of the high frequency component of the depeaked signal is relatively high, then the high pass filtered reconstructed luminance signal is passed to the output terminal. In this case, the scaling factor K1 is $-\frac{1}{4}$ and the scaling factor K2 is $\frac{1}{2}$, and the high frequencies are boosted relative to the low frequencies. As the level of the high frequency component of the depeaked luminance signal gradually decreases, the proportion of high pass filtered depeaked luminance signal is decreased in a continuous manner, and the proportion of unfiltered depeaked luminance signal is increased in a continuous manner. When the detected level of the high frequency component of the depeaked luminance signal is zero or nearly zero, then the unfiltered depeaked luminance signal is passed to the output terminal. In this case, the scaling factor K1 is zero and the scaling factor K2 is one, and no boost is provided. By properly preprogramming the look-up table 614, the adaptive peaking may be made the inverse operation of the adaptive depeaking done in the record channel. However, it may be desirable that the maximum level of boost applied to the depeaked luminance signal be limited to a lesser value than the maximum value theoretically necessary to completely reconstruct the original luminance signal.

During recording it is possible to derive a motion signal for adaptive chrominance/luminance signal separation from the input composite video signal itself. False motion may be introduced by the chrominance signal, but the false motion in the chrominance/luminance signal separator can be eliminated by vertically and horizontally low pass filtering the temporally high pass filtered signal. Because the chrominance sidebands do not extend down below 2 MHz, horizontal filtering ensures that false motion is removed.

As described above, the luminance high frequencies are folded into the low frequency luminance signal by modulating them on a folding carrier and placing this carrier in the Fukinuki hole, similar to the manner in which the chrominance subcarrier is placed in the composite video signal. However, there are no restrictions on the lower sidebands of the folded luminance high frequencies. In fact, diagonal detail in the full bandwidth luminance signal, when folded into the luminance low frequencies can extend all the way down to spatial DC. Because the folding carrier is alternating on a frame-to-frame basis (to maximize the temporal distance from DC) these diagonal details incorrectly get detected as false motion and no degree of spatial filtering can remove this false motion detection. Thus, to properly remove the reflected luminance signal from the unfolded luminance signal on playback, it is necessary to supply a separate channel for the motion representative signal.

One skilled in the art of video signal processor design will recognize that providing a separate channel for supplying the motion representative signal to the playback circuitry allows the motion adaptive luminance reconstruction process in the playback circuitry to mimic the motion adaptive processing of the chrominance/luminance signal separator in the record circuitry. For example, if the chrominance/luminance signal separator in the record circuitry chose temporal processing in some region of the image to derive the luminance signal, it would be incorrect to choose spatial processing to reconstruct the full bandwidth luminance signal in the same region of the image.

Further, the chrominance/luminance signal separation process, no matter how well done, introduces some artifacts into the image. The full bandwidth luminance signal reconstruction process also introduces artifacts into the image. If the second process is independent of the first process, then the artifacts introduced by the upstream process have artifacts introduced upon them by the downstream process, intensifying them. Artifact intensification can be greatly reduced if the downstream processing can be forced to follow the upstream processing. Providing a separate channel for the motion representative signal allows for both the above improvements.

It should be further noted that in a single VCR, there are some circuits which may be shared between the record channel and the playback channel. For example, modulators 518 and 902 may be a single modulator shared by use of an appropriate switching matrix, which may be constructed in a known manner. In addition, the adaptive depeaker 506 and the adaptive peaker 910 may be a single circuit shared by use of an appropriate switching matrix. This switching matrix also must either switch between two separate look-up tables, one (614) for the depeaker 506 and a separate one for the peaker 910, or alternatively a single look-up table may have a separate bit in the address input port of the ROM which effectively divides the storage locations in the ROM into two halves and indicates which half is to be used for the current operation—depeaking for recording or peaking for playback.

What is claimed is:

1. A backward compatible video signal recording system for recording a full bandwidth video signal on a limited bandwidth medium, comprising:
 an input terminal for receiving a composite video signal;
 encoding means, coupled to said input terminal, for producing a luminance signal having attenuated high frequencies folded into low frequencies and bandwidth limited to said limited bandwidth, and a signal including a chrominance component and a motion component;
 means for recording said luminance signal; and
 means for recording said signal including chrominance and motion components.

2. The system of claim 1, wherein said encoding means comprises: a motion signal separator, coupled to said input terminal; an adaptive luminance signal separator, coupled to said motion signal separator and said input terminal; an adaptive folding circuit, coupled to said adaptive luminance signal separator, for folding high frequencies of said luminance signal into low frequencies of said luminance signal a chrominance signal separator coupled to said input terminal; and a chrominance/motion signal combiner, coupled to said motion signal separator and said chrominance signal separator.

3. The system of claim 2, wherein said adaptive folding circuit comprises: an adaptive depeaker; a modulator coupled to said adaptive depeaker circuit and responsive to a folding carrier; and a low pass filter, having a passband equal to said limited bandwidth.

4. The system of claim 3, wherein said adaptive depeaker comprises: a horizontal high pass filter coupled to said luminance signal separator; a level detector coupled to said horizontal high pass filter; a horizontal low pass filter coupled to said luminance signal separator; and a soft switch having a first data input terminal coupled to said luminance signal separator, a second data input terminal coupled to said horizontal low pass filter, a control input terminal coupled to said level detector and an output terminal coupled to said modulator.

5. The system of claim 3, wherein said adaptive depeaker comprises:
 serially coupled first and second pixel time delay devices coupled to said luminance signal separator;
 a first adder having a first input terminal coupled to said luminance signal separator, and a second input terminal coupled to an output terminal of said second delay device;
 a first multiplier having a first input terminal coupled to an output terminal of said first adder; a second multiplier having a first input terminal coupled to an output terminal of said first delay device;
 a second adder having a first input terminal coupled to an output terminal of said first multiplier;
 a second input terminal coupled to an output terminal of said second multiplier, and an output terminal coupled to said modulator;
 a look-up table having an input terminal coupled to said level detector; and
 first and second output terminals coupled to respective second input terminals of said first and second multipliers.

6. The system of claim 1, wherein said encoder comprises:
 serially coupled temporal high pass filter and first horizontal high pass filter coupled to said input terminal;
 a first subtractor having a minuend input terminal coupled to said temporal high pass filter and a subtrahend input terminal coupled to said horizontal high pass filter;
 a magnitude detector coupled to said first subtractor;
 a signal spreader coupled to said magnitude detector, for producing a motion representative signal;
 serially coupled vertical high pass filter and horizontal high pass filter coupled to said input terminal;
 a second subtractor having a minuend input terminal coupled to said input terminal and a subtrahend input terminal coupled to said serially coupled vertical high pass filter and horizontal high pass filter;
 a third subtractor having a minuend input terminal coupled to said input terminal and a subtrahend input terminal coupled to said serially coupled temporal high pass filter and horizontal high pass filter;
 a soft switch having a first input terminal coupled to said second subtractor, a second input terminal coupled to said third subtractor, and a control input terminal coupled to said signal spreader, for producing a luminance signal;
 serially coupled horizontal bandpass filter, chrominance signal demodulator and anti-crosstalk processor for producing a chrominance signal;
 an adaptive folding circuit responsive to said luminance signal for producing a folded luminance signal having the same bandwidth as said limited bandwidth; and
 a circuit for combining said chrominance and said motion representative signal.

7. The system of claim 6, wherein said adaptive folding circuit comprises: an adaptive depeaker; a modulator coupled to said adaptive depeaker circuit and responsive to a folding carrier; and a low pass filter, having a passband equal to said limited bandwidth.

8. The system of claim 7, wherein said adaptive depeaker comprises: a horizontal high pass filter coupled to said luminance signal separator; a level detector coupled to said horizontal high pass filter; a horizontal low pass filter coupled to said luminance signal separator; and a soft switch having a first data input terminal coupled to said luminance signal separator, a second data input terminal coupled to said horizontal low pass filter, a control input terminal coupled to said level detector and an output terminal coupled to said modulator.

9. The system of claim 7, wherein said adaptive depeaker comprises: serially coupled first and second pixel time delay devices coupled to said luminance signal separator; a first adder having a first input terminal coupled to said luminance signal separator, and a second input terminal coupled to an output terminal of said second delay device; a first multiplier having a first input terminal coupled to an output terminal of said first adder; a second multiplier having a first input terminal coupled to an output terminal of said first delay device; a second adder having a first input terminal coupled to an output terminal of said first multiplier, a second input terminal coupled to an output terminal of said second multiplier, and an output terminal coupled to said modulator; a look-up table, having an input terminal coupled to said level detector, and first and second output terminals coupled to respective second input terminals of said first and second multipliers.

10. The system of claim 1, wherein said encoder comprises: serially coupled horizontal scan period delay device and frame scan period less one horizontal scan period delay device; a first subtractor having a subtrahend input terminal coupled to said video input terminal, and a minuend input terminal coupled to said horizontal scan period delay device; a first horizontal high pass filter coupled to said first subtractor; a second subtractor having a minuend input terminal coupled to said horizontal scan period delay device and a subtrahend input terminal coupled to said first horizontal high pass filter, for producing a spatially separated luminance signal; a third weighted subtractor having a minuend input terminal coupled to said video input terminal weighted by $\frac{1}{2}$ and a subtrahend input terminal coupled to said frame scan period less one horizontal scan period delay device weighted by $-\frac{1}{2}$; a second horizontal high pass filter coupled to said third subtractor; a fourth subtractor having a minuend input terminal coupled to said horizontal scan period delay device and a subtrahend input terminal coupled to said second horizontal high pass filter for producing a temporally separated luminance signal; a fifth subtractor having a minuend input terminal coupled to said third subtractor and a subtrahend input terminal coupled to said second horizontal high pass filter; and serially coupled rectifier, horizontal spreader and vertical spreader coupled to said fifth subtractor for producing a motion representative signal.

11. The system of claim 10, further comprising: a first multiplier responsive to said temporally derived luminance signal; a second multiplier responsive to said spatially derived luminance signal; an adder having a first input terminal coupled to said first multiplier, a second input terminal coupled to said second multiplier, and an output terminal for producing a luminance signal; and a look-up table having an input terminal responsive to said motion representative signal, and first and second output terminals for producing scaling factors supplied to respective second input terminals of said first and second multipliers.

12. The system of claim 1, wherein said adaptive folding circuit comprises: an adaptive depeaker; a modulator coupled to said adaptive depeaker circuit and responsive to a folding carrier; and a low pass filter, having a passband equal to said limited bandwidth.

13. The system of claim 12, wherein said adaptive depeaker comprises: a horizontal high pass filter coupled to said luminance signal separator; a level detector coupled to said horizontal high pass filter; a horizontal low pass filter coupled to said luminance signal separator; and a soft switch having a first data input terminal coupled to said luminance signal separator, a second data input terminal coupled to said horizontal low pass filter, a control input terminal coupled to said level detector and an output terminal coupled to said modulator.

14. The system of claim 12, wherein said adaptive depeaker comprises: serially coupled first and second pixel time delay devices coupled to said luminance signal separator; a first adder having a first input terminal coupled to said luminance signal separator, and a second input terminal coupled to an output terminal of said second delay device; a first multiplier having a first input terminal coupled to an output terminal of said first adder; a second multiplier having a first input terminal coupled to an output terminal of said first delay device; a second adder having a first input terminal coupled to an output terminal of said first multiplier, a second input terminal coupled to an output terminal of said second multiplier, and an output terminal coupled to said modulator; a look-up table, having an input terminal coupled to said horizontal high pass filter, and first and second output terminals coupled to respective second input terminals of said first and second multipliers.

15. An improved video signal playback system for reproducing a full bandwidth video signal previously recorded on a limited bandwitdth medium, comprising: luminance signal playback circuitry for reproducing a previously recorded limited bandwidth signal having attenuated high frequency components folded into low frequency components; chrominance signal playback circuitry for reproducing a previously recorded composite signal including a chrominance signal and a motion representative signal; and decoder means, coupled to said luminance and chrominance signal playback circuitry, for extracting said motion representative signal, unfolding said folded attenuated high frequency components and reproducing a full-bandwidth luminance signal, and producing a composite video signal consisting of said full bandwidth luminance signal and said chrominance signal.

16. The system of claim 18, wherein said decoder comprises: means for reproducing said folded luminance signal; means coupled to said luminance signal reproducing means for unfolding said luminance signal and producing said wideband luminance signal; means for reproducing said composite signal including said chrominance signal and said motion representative signal; means, coupled to said chrominance and motion representative signal reproducing means, for producing said motion representative signal and said chrominance signal; and means, responsive to said wideband luminance signal and said chrominance signal for producing a composite video signal.

17. The system of claim 16, wherein said adaptive unfolding circuit comprises: a high pass filter coupled to said luminance signal reproducing means having a passband for passing only said recorded luminance signal; a modulator coupled to said high pass filter and responsive to an unfolding carrier signal; a vertical low pass filter coupled to said modulator; an adder having a first input terminal coupled to said luminance signal reproducing means and a second input terminal coupled to said vertical low pass filter; a temporal low pass filter coupled to said adder; an adaptive spatial low pass filter, coupled to said adder; a soft switch having a first data input terminal coupled to said temporal low pass filter, a second data input terminal coupled to said adaptive spatial low pass filter and a control input terminal responsive to said motion representative signal; and an adaptive peaker circuit coupled to said soft switch for producing said wideband luminance signal.

18. The system of claim 17, wherein said adaptive peaker comprises: a first horizontal high pass filter coupled to said soft switch; a level detector coupled to said first horizontal high pass filter; a second horizontal high pass filter coupled to said soft switch; a second soft switch having a first data input terminal coupled to said first mentioned soft switch, a second data input terminal coupled to said second horizontal high pass filter, a control input terminal coupled to said level detector and an output terminal coupled to said composite video signal generator for producing said wideband luminance signal.

19. The system of claim 17, wherein said adaptive peaker comprises: a horizontal high pass filter coupled to said soft switch; a level detector coupled to said horizontal high pass filter; a second soft switch having a first data input terminal coupled to said first mentioned soft switch, a second data input terminal coupled to said horizontal high pass filter, a control input terminal coupled to said level detector and an output terminal coupled to said composite video signal generator for producing said wideband luminance signal.

20. The system of claim 17, wherein said adaptive peaker comprises: serially coupled first and second pixel time delay devices coupled to said soft switch; a first adder having a first input terminal coupled to said soft switch, and a second input terminal coupled to an output terminal of said second delay device; a first multiplier having a first input terminal coupled to an output terminal of said first adder; a second multiplier having a first input terminal coupled to an output terminal of said first delay device; a second adder having a first input terminal coupled to an output terminal of said first multiplier, a second input terminal coupled to an output terminal of said second multiplier, and an output terminal coupled to said composite video signal generator; and a look-up table, having an input terminal coupled to said horizontal high pass filter, and first and second output terminals coupled to respective second input terminals of said first and second multipliers.

21. A video signal recording and playback system for recording a full bandwidth video signal on a limited bandwidth medium and reproducing a previously recording video signal, comprising:
an input terminal for receiving a composite video signal;
encoding means, coupled to said input terminal, for producing a luminance signal having attenuated high frequencies folded into low frequencies and bandwidth limited to said limited bandwidth, and a combination signal including a chrominance component and a motion representative component;
means for recording said luminance signal;
means for recording said combination signal;
luminance signal playback circuitry for reproducing a previously recorded limited bandwidth luminance signal, representing a full bandwidth luminance signal, representing a full bandwidth luminance signal, having attenuated high frequency components folded into low frequency components;
combination signal playback circuitry for reproducing a previously recorded combination signal including a previously recorded chrominance signal and a previously recorded motion representative signal; and
decoder means, coupled to said luminance and combination signal playback circuitry, for extracting said previously recorded motion representative signal, unfolding said folded attenuated high frequency components and reproducing said previously recorded full-bandwidth luminance signal, and producing a composite video signal consisting of said full bandwidth luminance signal and said previously recorded chrominance signal.

22. A video signal system, comprising:
means for receiving a composite video signal exhibiting a first bandwidth;
encoding means, coupled to said input terminal, for producing a luminance signal having attenuated high frequency components folded into low frequencies and a second bandwidth substantially less than said first bandwidth, and a signal including a chrominance component and a motion component;
means for recording said luminance signal; and
means for recording said signal including said chrominance component and said motion component.

23. The video signal system of claim 22, further comprising:
luminance signal playback means for reproducing said luminance signal after said recording of said luminance signal;
chrominance signal playback means for reproducing said signal including said chrominance signal and said motion component; and
decoder means, coupled to said luminance and chrominance signal playback circuitry, for extracting said motion component, unfolding said attenuated high frequency components and reproducing an output luminance signal exhibiting said first bandwidth, and for producing a composite video signal including said output luminance signal and said chrominance signal.

24. A backward compatible video signal recording process, comprising:
receiving a composite video signal exhibiting a first bandwidth;
producing a luminance signal having attenuated high frequencies folded into low frequencies within a limited bandwidth narrower than said first bandwidth, and a signal including a chrominance component and a motion component;
recording said luminance signal; and
recording said signal including chrominance and motion component.

25. A process for reproducing a full bandwidth video signal previously recorded on a limited bandwidth medium, comprising:
reproducing a luminance signal previously recorded as a limited bandwidth signal having attenuated high frequency components folded into low frequency components;
providing a reproduced composite signal by reproducing a previously recorded composite signal comprising a chrominance signal and a motion representative signal;
extracting said motion representative signal from said reproduced composite signal;
providing an unfolded luminance signal by unfolding said attenuated high frequency components from said low frequency components in response to the motion representative signal;
reproducing from said unfolded luminance signal, a full-bandwidth luminance signal exhibiting a second bandwidth wider than said limited bandwidth; and
producing a composite video signal comprising said full bandwidth luminance signal and said chrominance signal.

26. The video signal system of claim 22, further comprising:
luminance signal playback means for reproducing said luminance signal after said recording of said luminance signal;
chrominance signal playback means for reproducing said signal including said chrominance signal and said motion component; and
decoder means, coupled to said luminance and chrominance signal playback circuitry, for extracting said motion component, unfolding said attenuated high frequency components in response to the motion component and reproducing an output luminance signal exhibiting said first bandwidth, and for producing a composite video signal including said output luminance signal and said chrominance signal.

27. A video signal recording and playback system for recording a full bandwidth video signal on a limited bandwidth medium and reproducing a previously recording video signal, comprising:
an input terminal for receiving a composite video signal;
encoding means, coupled to said input terminal, for producing a luminance signal having attenuated high frequencies folded into low frequencies and bandwidth limited to said limited bandwidth, and a combination signal including a chrominance component and a motion representative component;
means for recording said luminance signal;
means for recording said combination signal;
luminance signal playback circuitry for reproducing a previously recorded limited bandwidth luminance signal, representing a full bandwidth luminance signal, having attenuated high frequency components folded into low frequency components;
combination signal playback circuitry for reproducing a previously recorded combination signal including a previously recorded chrominance signal and a previously recorded motion representative signal; and
decoder means, coupled to said luminance and combination signal playback circuitry, for extracting said previously recorded motion representative signal, unfolding said folded attenuated high frequency components in response to the motion representative signal and reproducing said previously recorded full bandwidth luminance signal, and producing a composite video signal comprising said full bandwidth luminance signal and said previously recorded chrominance signal.

* * * * *

UNITED STATES PATENT AND TRADEMARK OFFICE
CERTIFICATE OF CORRECTION

PATENT NO. : 5,113,262

DATED : 12 May 1992

INVENTOR(S) : Christopher STROLLE, et al.

It is certified that error appears in the above-identified patent and that said Letters Patent is hereby corrected as shown below:

On the Title page, item [57],
IN THE ABSTRACT

Line 35, change "objectionably" to --objectionable--.

IN THE SPECIFICATION

| | | |
|---|---|---|
| Column 3, | Line 32, | change "were" to --was--; |
| | Line 55, | insert --may-- after "signal". |
| Column 4, | Line 46, | change "processing" to --processes--. |
| Column 9, | Line 33, | change "preliminary" to --preliminarily--. |
| Column 10, | Line 2, | change "two tap" to --two-tap--; |
| | Line 27, | insert --435-- before "is". |
| Column 15, | Line 24, | change "chrominancea" to --chrominance--. |
| Column 16, | Line 16, | change "recoved" to --recovered--. |

Signed and Sealed this

Seventeenth Day of August, 1993

*Attest:*

BRUCE LEHMAN

*Attesting Officer*    *Commissioner of Patents and Trademarks*